United States Patent Office 2,950,226
Patented Aug. 23, 1960

2,950,226

METHOD OF PRODUCING 11α-HYDROXYSTEROIDS WITH THE GENUS FUSARIUM

Heinz-Jürgen Mannhardt and Harald Metz, Darmstadt, Germany, assignors to E. Merck Aktiengesellschaft, Darmstadt, Germany No Drawing. Filed Mar. 9, 1959, Ser. No. 797,871

Claims priority, application Germany Mar. 19, 1958

7 Claims. (Cl. 195—51)

The invention relates to the production of 11α-hydroxysteroids.

It is the object of our invention to provide a new method for producing 11α-hydroxysteroids microbiologically in such a manner, that the unreacted starting material is largely or completely degraded, so that a separation of the final product of 11α-hydroxysteroids from the reaction medium can be effected in a much more simple manner than with any known process, while at least maintaining substantially the same yield rates as in the known process or achieving even better yields.

It is another object of the invention to simplify in processes for the production of therapeutically interesting steroids the process stage for the microbiological production of 11α-hydroxysteroids in such a manner that the cost of the entire process and thereby of the therapeutically interesting steroids derived from the 11α-hydroxy combinations will be substantially reduced.

It is finally an object of the invention to provide a method for the production on an industrial scale of 11α-hydroxylated steroids by way of microbiological hydroxylation treatment from 1-dehydrated steroids such as, for instance, 1-dehydro-Reichsteins-substance-S or from 1,6-bis-dehydro-steroids such as, for instance, 1,6-bis-dehydro Reichsteins-substance-S.

Most of the therapeutically interesting compounds of the pregnane group have oxygen functions in the 11-position.

Up to now, the introduction of a hydroxyl group into the 11-position by purely chemical means is only possible through processes envolving a great number of reaction steps.

As far as these substances are obtained via the microbiological hydroxylation of the 11-position, the hitherto known processes suffer from the drawbacks that the resulting fermentation mixtures either contain small quantities only of the desired 11-hydroxylation product or that there remains unconverted and undegraded starting steroid which is difficult to separate from the 11-hydroxylated product.

More recently, 11-hydroxylated and simultaneously 9-halogenated steroids have played an important part in the production of therapeutically interesting steroids. Insofar as they effect the introduction of the 11-hydroxy groups microbiologically, these processes all suffer from the drawback that, beside the desired 11α or 11β-hydroxysteroids in the microbiological reaction mass, there are still present larger or smaller residual amounts of the starting steroid or products hydroxylated in positions other than the 11-position, whereby the isolation of the desired hydroxylated products becomes very difficult and requires a considerable number of intermediary steps, which fact increases the costs of the process and thereby of the therapeutically more interesting substances derived from these 11-hydroxysteroids.

Among further interesting products, which can also be obtained via the 11-hydroxysteroids, there are the 11-keto-steroids, which can also be transformed into therapeutically interesting products.

The microbiological introduction of an 11-hydroxyl group into steroid hormones has been known for a long time. Fungi of the genus Aspergillus, Pencillium, Rhizopus, Mucor, Pestalotia, Neurospora and Heliocostylum have been used for this purpose until now. (See H. Eppstein, P. D. Meister, H. C. Murray, D. H. Peterson, in "Vitamines and Hormones," vol. 14, pages 359 (1956)).

For instance, when microbiologically converting Reichsteins-substance-S by a fungus of one of the above mentioned genus, and extracting the fermentate with chloroform, there results in the chloroform extract a mixture of undegraded Reichsteins-substance-S with the desired 11-hydroxy-derivatives of the same, the separation of which mixture is extremely difficult, due to the far-reachingly similar behavior of the components and requires, as is well known, a considerable number of separation steps.

Furthermore, the micro-organisms hitherto known as capable of effecting 11-hydroxylation are not capable at all of transforming 1-dehydrosteroids such as, for instance, 1-dehydro-Reichsteins-substance-S, or 1,6-bis-dehydrosteroids such as, for instance, 1,6-bis-dehydro-Reichsteins-substance-S into the corresponding 11-hydroxylated steroids, or are only capable of doing so in negligible amounts.

These various drawbacks of the known processes are avoided and the above stated objects of our invention are attained by the method according to our invention, which is based on our discovery that fungi of the genus Fusarium, namely of the sections discolor, gibbosum and elegans-oxysporum are well suited for introducing an 11α-hydroxyl group into steroids. In the past, fungi of the genus Fusarium have only been used rarely for reactions envolving steroids. Thus, it is known that Fusarium solani is capable of introducing a 1,2 double bond into steroids (E. Vischer et al., "Helvetica Chimica Acta" vol. 38, page 835 (1955)). Moreover, the hydroxylation of a few steroids in 15α-position by Fusarium lini has also been described (A. Gubler et al., "Helvetica Chimica Acta," vol. 41, page 301 (1958)). However, these strains of fungi which have been used for obtaining chemical reactions in steroids do not belong to the above mentioned three Fusarium sections. Our nomenclature is based on the systematic description of the genus Fusarium by H. W. Wollenweber and A. O. Reinking in "Die Fusarien, ihre Beschreibung, Schadwirkung und Bekämpfung," published by Paul Parey, Berlin 1935.

We have found that the micro-organisms of the three above-mentioned 11α-hydroxylating Fusarium sections possess considerable advantages as compared with the hitherto known organisms capable of the 11α-hydroxylation of steroids. First of all, when the aforesaid Fusarium fungi are used in the process according to our invention, the 11α-hydroxylation reaction takes place with particular speed. While the hitherto used strains of other genus usually need several days for effecting the reaction, the fungi to be used according to our invention are capable of effecting the 11α-hydroxylation reaction at such speed that after an incubation of 24 to 25 hours at the most, the fermentate does no longer contain any starting material. Sometimes, the reaction is already completed within 7 hours. Moreover, the reaction with the aid of strains belonging to the above-mentioned three Fusarium sections proceeds substantially in only one direction. Losses due to secondary reactions are very small, so that exceptionally good yield rates are obtained. This occurs very rarely in hydroxylation reactions with the aid of fungi.

Contrary to the known 11-hydroxylation processes in which the conventional micro-organisms are employed, it is even possible to convert 1-dehydro- and 1,6-bis-dehydro-steroids, with a considerable number of the Fusarium strains enumerated below as belonging to the above mentioned three sections, in a smooth and rapidly proceeding reaction into the corresponding 11α-hydroxylated derivatives. Thus, the new method, as compared with any other method known up to the present time, offers substantial advantages in the introduction of hydroxyl group in 11-position in a steroid.

As starting materials for the 11α-hydroxylation method according to our invention there can be used all steroids of the pregnane group possessing no oxygen function in the 11-position such as, for instance, Reichsteins-substance-S; 1-dehydro-Reichsteins-substance-S; 1,6-bis-dehydro-Reichsteins-substance-S; 16(α), 17(α)-oxido-pregnenolone acetate; progesterone; 1-dehydro-progesterone; 16-dehydro-progesterone; 16(α), 17(α)-oxido-progesterone, and, for instance, desoxycorticosterone.

The method of the present invention is appropriate for the production of 11α-hydroxysteroids of the general formula:

(I)

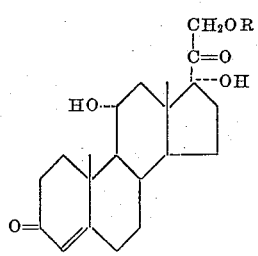

which steroids can be unsaturated in 1-and/or 6-position and wherein R is a hydrogen atom or the acetyl radical; comprising the steps of treating compounds of the general formula:

(II)

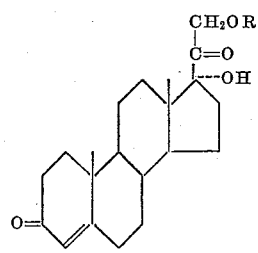

which can be unsaturated in 1- and/or 6-position and wherein R has the above stated meaning; either with Fusarium strains of the sections *discolor* and/or *gibbosum* and/or *elegans-oxysporum* or with the oxidizing enzymes derived from these fungi and isolating the resulting 11α-hydroxysteroids from the reaction mixture, preferably by extraction, for instance with chloroform and can then be transformed in a known manner into the corresponding 21-acetates.

Since a classification of the Fusarium strains depassing these sections is complicated and subject to some uncertainties, the individual strains which have been found suitable in the method of the invention have been designated in conformity with the internal numbering of the fungus collection of the firm E. Merck AG., Darmstadt, Germany, which is also applied in the description of the examples given further below.

The introduction of an 11α-hydroxyl group into steroids of the above general Formula II can be successfully accomplished, for instance, with the following fungi of the genus Fusarium:

Fusarium, Sectio *discolor*:
  Fusarium culmorum (W.G.Sm.) Saccardo (2092),
  Fusarium sambucinum Fuckel (2077),
  Fusarium sambucinum Fuckel (2102),
  Fusarium reticulatum Montagne (2091),
  Fusarium reticulatum Montagne f. 1 Wollenweber (2095), Fusarium heterosporum Nees (2093),
  Fusarium sp. (2070),
  Fusarium sp. (2074),
Fusarium, Sectio *gibbosum*:
  Fusarium equiseti Saccardo var. *bullatum* (Sherbakoff) Wollenweber (2083),
  Fusarium equiseti Saccardo var. *bullatum* (Sherbakoff) Wollenweber (2090),
Fusarium, Sectio *elegans-oxysporum*:
  Fusarium oxysporum Schlechtendahl (2086),
  Fusarium redolens Wollenweber (2087),
  Fusarium redolens Wollenweber (2094),
  Fusarium bulbigenum Cke. et Mass. (2096),
  Fusarium sp. (2089),
  Fusarium sp. (2088).

These strains can be bred, for instance, in a nutritive solution of malt extract and peptone (2% malt extract, 0.2% peptone obtained from casein). A nutritive solution containing glucose, soybean flour, yeast extract, primary potassium phosphate and sodium-chloride can also be used. These nutritive media are well known in the art. The hydroxylation reaction with the aid of the Fusarium fungi is accomplished under sufficient aeration, in general with a flow rate of approximately 600 liters of air per hour per culture in a small fermenter having a capacity of approximately 13 liters. Reaction times are between 7 and 25 hours.

Therapeutically still more effective substances can be prepared by further known steps from the 11α-hydroxy-steroids obtained by the method according to our invention. Such substances had to be produced until now via the 11-β-hydroxides which can also be produced, for instance, by means of certain other genus of fungi. However, the known methods via the 11β-hydroxides entail still greater difficulties in exploiting the fermentation products than the above mentioned known method.

The 11α-hydroxysteroids obtained according to our method can be converted into the corresponding 11-keto-steroids by treating them with an appropriate oxidizing agent, eventually after having protective acetylation of the 21-hydroxyl group. Chromic anhydride or a mixture of chromic anhydride with a tertiary organic base such as pyridine, or lutidine or with a mixture of glacial acetic acid and water are especially appropriate for such oxidation.

The hydroxyl group in the 21-position in the 11a-hydroxylated steroids can also be esterized by a large number of physiologically harmless acids, preferably organic acids, in a manner known per se. Esterization, especially to 21-acetate, is expediently accomplished by conversion with acetyl chloride or acetic acid anhydride in the presence of a tertiary organic base, such as, for instance, pyridine, preferably used are molar quantities of acetic acid anhydride and 11α-hydroxysteroid, or else a surplus of acetyl chloride is reacted with a mixture of molar quantities of steroid and the tertiary organic base, for instance pyridine.

Double bonds can be introduced simultaneously or successively in 1- and/or 6-position into the 11α-hydroxy- or 11-keto-steroids by the method of our invention by treating these steroids with chemical or microbiological dehydrogenation agents.

Thus, it is possible to introduce a 6-double bond into the 11α-hydroxysteroids, produced according to the invention, by means of a treatment with chloranile or by bromination, (e.g. with N-bromo-succinimide) and subsequent reaction of an agent clearing off hydrogen bromide, such as, for instance, pyridine.

A 1-double bond can be introduced into the 11a-hydroxysteroids, obtained according to the method of the invention and which are either free from or already have a second double bond in 6-position, by means of selenium dioxide or by a successive treatment with elementary bromine and an agent clearing off halogen hydride, or by a treatment with an appropriate micro-organism, such as, for instance, *Corynebacterium simplex* or *Bacillus sphaericus*.

The 1-and 6-double bonds can also be introduced simultaneously into the 11α-hydroxysteroids, eventually after oxidation to the corresponding 11-keto-steroids, by treating them with triethyl orthoformate thus obtaining first the respective 3-enolic ether and further by treating the resulting compound with chloranile. Thereby, the corresponding 1,4,6-pregnatriene is obtained in an easy reaction.

The method according to the invention thus permits to introduce an oxygen function in an 11α-position in an easy reaction and with good yields without the necessity of removing disturbing byproducts by complicated purification methods.

It is especially possible, according to the method of the invention, to convert Reichsteins-substance-S in two stages to cortisone and in three stages to prednisone.

The invention will be further illustrated by a number of examples which are, however, not to be considered as limitative of the scope of the invention.

The preparation of the starting materials used in these examples is not described in the latter in detail, since it is well-known to a skilled steroid chemist. For those less skilled in the art the following publications shall be mentioned:

Reichsteins-Substance-S: Journal of the American Chemical Society, vol. 71, 3574 (1949);

1-dehydro-Reichsteins-Substance-S: Helvetica Chimica Acta, vol. 38, 835 (1955);

1,6-bis-Dehydro-Reichsteins-Substance-S: DAS 1 0 44 077.

The necessary incubation of the micro-organisms used in the example requires a temperature of approximately 24° to 32° C., while optimum bacterial growth is obtained at about 28° C.

Example I

A culture of the above-mentioned strain 2083 of *Fusarium equiseti* Saccardo var. *bullatum* (Sherbakoff) Wollenweber is grown in 200 ccs. of a nutrient solution containing 2% by weight of malt extract, 0.2% of peptone from casein and water, by shaking in a conventional manner in a 1000 ccs. Erlenmeyer flask. After a growth of 24 hours at optimal incubating temperature, 100 milligrams of Reichsteins-substance-S in 4 ccs. of methanol are added to the culture. After further incubation during 24 hours at an optimal growth temperature of 28° C., the culture solution is extracted by shaking the same three times with about 100 milliliters (ml.) of chloroform. The combined chloroform extracts are dried over calcined sodium sulfate and the solvent is then evaporated to dryness on a water bath, or in another conventional manner under reduced pressure.

Paper chromatography employing the solvent systems $B_1$ and $B_4$ according to I. E. Bush, Biochemical Journal vol. 50, page 370 (1952) reveals that no Reichsteins-substance-S is present any more in the extract, which contains dissolved as reaction product only the 11-α hydroxylated product, which is 11-epi-hydrocortisone:

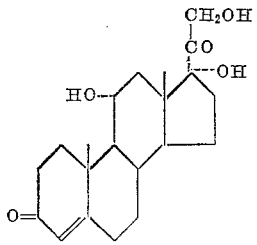

The pure 11-epi-hydrocortisone is obtained from the chloroform extract by a single crystallization, whereby it is freed substantially completely from any substances extracted by the solvent from the nutritive solution.

The reaction product is identified by comparing its melting point with that of authentic 11-epi-hydrocortisone.

Instead of chloroform any other conventional solvent suitable for the extraction of such fungus cultures can be used, in particular the conventional chlorinated hydrocarbons such as methylene chloride or carbon tetrachloride.

Example II

Ten liters of a nutritive solution composed as in the preceding example are filled in a small fermenter having a capacity of 13 liters and are inoculated with about 750 ccs. of a culture of strain 2083 supra prepared as in Example I. After 24 hours of incubation under vigorous stirring and aeration at a flow rate of 600 liters of air per hour, a solution of 5 grams of Reichsteins-substance-S in 200 ccs. of methanol is added. The incubation is then continued for 25 hours under optimal conditions of bacterial growth. During this second incubation period the progress of the reaction is continuously controlled with the aid of paper chromatographical tests. The culture solution is then extracted three times by shaking with 5 liters of chloroform. The chloroform extraction is dried as in Example I and concentrated by evaporation of a part of the solvent under reduced pressure to a volume of 80 ccs. Upon cooling of the concentrate, 3.7 grams of a slightly yellowish crude product are obtained in crystals, which are recrystallized from their solution in acetone as completely pure 11-epi-hydrocortisone which is characterized by a melting point of 210° to 213° C., and shows in ethanol solution a rotation of polarized light, amounting to $(\alpha)_D = +117°$.

Example III

A culture of the above-mentioned strain 2083 of *Fusarium equiseti* Saccardo var. *bullatum* (Sherbakoff) Wollenweber is prepared in 200 ccs. of a nutritive solution of 2% of glucose, 0.5% of soybean flour, 0.5% of yeast extract, 0.5% of primary potassium phosphate $KH_2PO_4$, 0.5% of sodium chloride and water (all percentages being by weight), as described by F. Hanson et al., Journal of the American Chemical Society (volume 75, page 5369 of 1953), by shaking during 24 hours and incubation at optimal conditions of temperature. After growth of the culture during the aforesaid 24 hours, 100 milligrams of 1-dehydro-Reichsteins-substance-S, dissolved in 4 ccs. of methanol are added. The culture solution is further processed for another 24 hours in the manner described in Example I.

The resulting reaction product is tested qualitatively by paper chromatography and a yield rate of 80% of a new substance is determined, which substance is identified on the basis of its paper chromatographical behavior as being exclusively 11-epi-prednisolone.

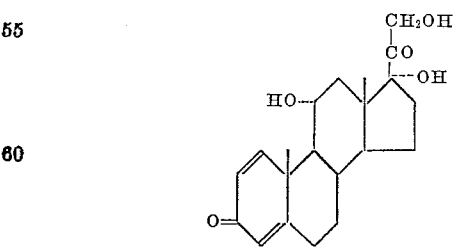

free from any starting steroid.

Example IV

Ten liters of a nutritive solution composed according to Hanson et al., supra, are filled in a small fermenter having a capacity of 13 liters and are inoculated with 750 ccs. of a culture of strain 2083 supra prepared as in Example III. After 24 hours of incubation under vigorous stirring and aeration at a flow rate of 600 liters of air per hour, a solution of 5 grams of 1-dehydro-Reichsteins-substance-S in 200 ccs. of methanol is added. The incubation is then continued for 28 hours under conventional conditions such as a temperature of 28° C. optimal for bacterial growth, while the progress of the reaction is currently controlled by paper chromatographical tests. The culture solution is then extracted three times by shaking with 5 liters of chloroform, the combined chloroform extracts are dried over calcined sodium sulfate and concentrated under reduced pressure to a small volume of about 100 ccs. 3.2 grams of crude 11-epi-prednisolone crystallize upon cooling of the concentrate which is practically free from any undegraded 1-dehydro-Reichsteins-substance-S. By a single recrystallization from acetone, pure 11-epi-prednisolone is obtained which is identified by the following data: Melting point: 206–208° C.; $(\alpha)_D = +76°$ (dioxane solution).

Example V

One gram of 11-epi-prednisolone, obtained as described in Example IV, is dissolved in 5 ml. of pyridine, 0.29 grams of acetic acid anhydride are added, and the solution is left standing at room temperature for about 20 hours. The mixture is then poured into 100 ccs. of water and extracted three times by shaking with 40 ccs. of chloroform. The chloroform solution is extracted by shaking with 100 ccs. of diluted sulfuric acid containing 5% by weight of $H_2SO_4$. The chloroform extract is separated from the aqueous sulfuric acid phase and washed to neutrality in a conventional manner with an aqueous sodium bicarbonate solution and water, then dried over calcined sodium sulfate and the solvent evaporated to dryness under reduced pressure. Thereby, 0.97 grams of the 21-acetate of 11-epi-prednisolone is obtained in the form of a non-crystallizable substance of glassy amorphous appearance.

Example VI

The amount of almost 1 gram of 11-epi-prednisolone-21-acetate obtained from the testing example is dissolved in 10 ml. of pyridine and added to a mixture of 1 gram of chromic acid anhydride $CrO_3$ and 10 ml. of pyridine. The resulting mixture is left standing at room temperature for about 6 hours during which time it assumes a brownish-black color. This reaction mixture is then poured into 50 ml. of boiling acetic acid ethyl ester, and boiled for 10 minutes under a reflux condenser, separated still hot from the formed precipitate on a suction filter, and the residue on the filter washer with more hot acetic acid ethyl ester. The combined filtrates are shaken with diluted sulfuric acid having a concentration of 5% by weight of $H_2SO_4$, then washed to neutrality with water and an aqueous sodium bicarbonate solution, dried and then freed from the solvent by evaporation of the latter under reduced pressure to dryness. The residue is recrystallized from acetone and a crude 0.69 gram of prednisone-21-acetone is obtained. By repeated recrystallization from acetone, a pure prednisone-21-acetate is obtained which is identified by the following data: Melting point: 235–237° C. $(\alpha)_D = +197.3°$ (dioxane).

Example VII 100 milligrams of 1,4,6-pregnatriene-17($\alpha$),21-diol-3,20-dione, dissolved in 4 ccm. of methanol are added to a culture of the strain 2083 (*Fusarium equiseti* Saccardo var. *bullatum* (Sherbakoff) Wollenweber), prepared by shaking a culture as described in Example III. After a growth of the culture during 24 hours, it is processed as described in Example III. The paper chromatographical test shows an almost quantitative conversion of the starting material to a product which on account of its chromatographical behavior can be identified as 6-dehydro-11-epi-prednisolone.

Example VIII

Example I is repeated, but with a culture of the strain 2070 supra (Fusarium, sectio *discolor*). Paper chromatography shows the exclusive formation of 11-epi-hydrocortisone, which is formed practically quantitatively after 24 hours.

Example IX

Example I is repeated, but with a culture of the strain 2074 supra (Fusarium, sectio *discolor*). After 24 hours an almost quantitative amount 11-epi-hydrocortisone has been formed.

Example X 100 milligrams of Reichsteins-substance-S are treated with *Fusarium redolens* Wollenweber (strain 2087), in the manner as described in Example I. After approximately 24 hours an almost quantitative conversion to 11-epi-hydrocortisone has taken place.

Example XI

Example I is repeated, but with a culture of *Fusarium culmorum* Saccardo (strain 2092). With a good yield, 11-epi-hydrocortisone can be obtained after a treatment time of 24 hours not including the time required for growth of the culture.

Example XII

A culture of the strain 2083 (*Fusarium equiseti* Saccardo var. *bullatum* (Sherbakoff) Wollenweber) is prepared under shaking as in Example I and, after a growth of 24 hours, a solution of 100 milligrams of 6-dehydro-Reichsteins-substance-S in 4 ccs. of methanol is added. After another 24 hours, paper chromatography shows the complete conversion of the starting material to 6-dehydro-11-epi-hydrocortisone.

Example XIII

Example I is repeated with a culture of the strain 2083 supra (*Fusarium equiseti* Saccardo var. *bullatum* (Sherbakoff) Wollenweber) but with 100 milligrams of Reichsteins-substance-S-21-acetate as the starting material. After an incubation of 48 hours 11-epi-hydrocortisone can be obtained in a good yield.

Example XIV

To 1 gram of 6-dehydro-11-epi-cortisol, dissolved in 250 ml. of dioxane, 0.23 ml. of pyridine as well as 0.30 ml. (approximately 50% excess) acetyl chloride are added and left standing over night at room temperature. The larger portion of the solvent is distilled off under reduced pressure and the residue is taken up with chloroform. The chloroform solution is shaken with diluted sulfuric acid having a concentration of 5% $H_2SO_4$ and then washed to neutrality with a sodium dicarbonate solution and water. After drying, the solvent is evaporated under reduced pressure, whereby the 21-acetate remains as a non-crystallizable residue. The yield amounts to 0.91 grams. By oxydation with pyridine and chromic acid to the well-known 6-dehydrocortisone-acetate, it can be shown, similar to Example I, that the amorphous acetylation product contains the desired 6-dehydro-11-epi-cortisol-21-acetate.

Example XV

The 6-dehydro-11-epi-prednisolone, obtained as described in Example VII, is acetylated in 21-position by an analogous treatment as described in Example V. This acetate is obtained in a non-crystalline state. It is identified by its oxydation (see Example VI) to the well-known 6-dehydro-prednisone-acetate.

It will be understood that this invention is susceptible to further modification and, accordingly, it is desired to comprehend such modifications within this invention as may fall within the scope of the appended claims.

We claim:

1. In a process of producing steroids having an oxygen-containing functional group in the 11-alpha-position, the steps of adding to a culture of at least one fungus of a section of the genus Fusarium selected from the group consisting of the sections *discolor, gibbosum,* and *elegans-oxysporum,* a starting steroid selected from the group consisting of compounds of the general formula:

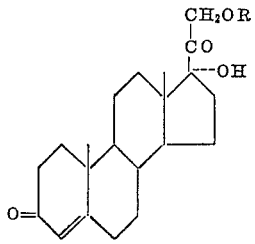

wherein R is selected from the group consisting of a hydrogen atom and acetyl, compounds of the aforesaid general formula which are unsaturated in 1-position, compounds of the aforesaid general formula which are unsaturated in 6-position and compounds of the aforesaid general formula which are unsaturated in 1- and 6-positions; aerobically incubating the resulting mixture in a nutrient medium at 24–32° C. for 7–25 hours to obtain the 11-α-hydroxy derivative of the starting steroid.

2. The process of producing microbiologically dehydrosteroids having a hydroxyl group in the 11-alpha-position comprising the steps of adding to a culture of at least one fungus of a section of the genus Fusarium selected from the group consisting of the sections *discolor, gibbosum,* and *elegans-oxysporum,* a 1,4-bis-dehydro-steroid having the general formula

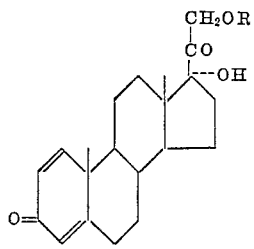

wherein R is selected from the group consisting of a hydrogen atom and acetyl; aerobically incubating the resulting mixture in a nutrient medium at 24–32° C. for 7–25 hours to obtain the 11-α-hydroxy derivative of the starting steroid.

3. The process of producing microbiologically dehydrosteroids having a hydroxyl group in the 11-alpha-position comprising the steps of adding to a culture of at least one fungus of a section of the genus Fusarium selected from the group consisting of sections *discolor, gibbosum,* and *elegans-oxysporum,* a 1,6-dehydrosteroid having the general formula:

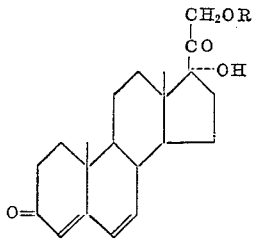

wherein R is selected from the group consisting of a hydrogen atom and acetyl; aerobically incubating the resulting mixture in a nutrient medium at 24–32° C. for 7–25 hours to obtain the 11-α-hydroxy derivative of the starting steroid.

4. The process of producing microbiologically dehydrosteroids having a hydroxyl group in the 11-alpha-position comprising the steps of adding to a culture of at least one fungus of a section of the genus Fusarium selected from the group consisting of sections *discolor, gib-* *bosum,* and *elegans-oxysporum,* a 4,6-bis-dehydrosteroid having the general formula:

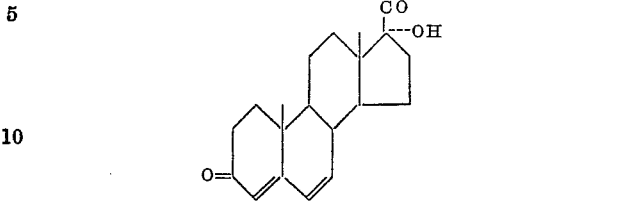

wherein R is selected from the group consisting of a hydrogen atom and acetyl; aerobically incubating the resulting mixture in a nutrient medium at 24–32° C. for 7–25 hours to obtain the 11-α-hydroxy derivative of the starting steroid.

5. In the process of producing 11(α) hydroxylated steroids microbiologically from a starting steroid selected from the group consisting of compounds of the general formula:

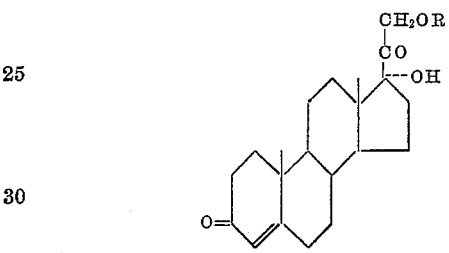

wherein R is selected from the group consisting of a hydrogen atom and acetyl, compounds of the aforesaid general formula which are unsaturated in 1-position, compounds of the aforesaid general formula which are unsaturated in 6-position and compounds of the aforesaid general formula which are unsaturated in 1- and 6-positions; the step which comprises contacting said starting steroid with the oxidizing activity of a culture of at least one fungus of a section of the genus Fusarium selected from the group consisting of sections *discolor, gibbosum,* and *elegans-oxysporum.*

6. The process step claimed in claim 1, wherein the fusarium used is *Fusarium equiset* Saccardo var. *bullatum* (Sherbakoff) Wollenweber.

7. A process for the 11-alpha-hydroxylation of a steroid compound which comprises cultivating aerobically at least one fungus of a section of the genus Fusarium selected from the group consisting of the sections *discolor, gibbosum,* and *elegans-oxysporum* in a nutrient medium containing a steroid compound selected from the group consisting of compounds of the general formula:

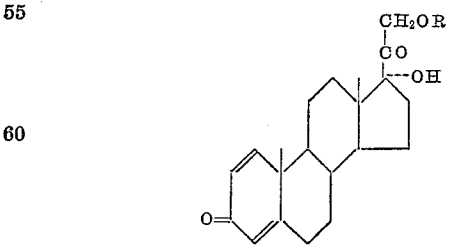

wherein R is selected from the group consisting of a hydrogen atom and acetyl, compounds of the aforesaid general formula which are unsaturated in 1-position, compounds of the aforesaid general formula which are unsaturated in 6-position and compounds of the aforesaid general formula which are unsaturated in 1- and 6-positions.

References Cited in the file of this patent
UNITED STATES PATENTS
2,765,258    Shull et al. _____ Oct. 2, 1956